(12) United States Patent
Fain

(10) Patent No.: US 8,487,514 B2
(45) Date of Patent: Jul. 16, 2013

(54) APPARATUS AND METHOD FOR HARVESTING ENERGY

(75) Inventor: Romy Fain, Ithaca, NY (US)

(73) Assignee: Romy Fain, San Francisco, CA (US)

( * ) Notice: Subject to any disclaimer, the term of this patent is extended or adjusted under 35 U.S.C. 154(b) by 332 days.

(21) Appl. No.: 12/878,509

(22) Filed: Sep. 9, 2010

(65) Prior Publication Data

US 2011/0057547 A1    Mar. 10, 2011

Related U.S. Application Data

(60) Provisional application No. 61/276,479, filed on Sep. 10, 2009.

(51) Int. Cl.
*H01L 41/113* (2006.01)
(52) U.S. Cl.
USPC ............................................. 310/339
(58) Field of Classification Search
USPC ................................................ 310/339
See application file for complete search history.

(56) References Cited

U.S. PATENT DOCUMENTS

| 7,692,366 B2 * | 4/2010 | Thiesen | 310/339 |
| 2008/0074002 A1 * | 3/2008 | Priya et al. | 310/339 |
| 2010/0253184 A1 * | 10/2010 | Choi et al. | 310/339 |
| 2010/0264779 A1 * | 10/2010 | Ono | 310/339 |

* cited by examiner

Primary Examiner — Thomas M Dougherty

(57) ABSTRACT

An apparatus for generating electrical energy from mechanical vibrations of an object is provided. The apparatus comprises a case for housing the object. The case comprises: a first case member comprising a first and a second opposing surfaces, said first case member comprising an internal space between the first and the second opposing surfaces; multiple piezoelectric elements for generating electrical energy from the mechanical vibrations, each piezoelectric element comprises a first and a second end, wherein each piezoelectric element being arranged over the first and the second opposing surfaces at the first end; a second case member movably suspended on the first case member, said second case member interfaces with the second end of piezoelectric elements arranged over the first opposing surface; and a third case member movably suspended on the first case member, said third case member interfaces with the second end of piezoelectric element arranged over the second opposing surface.

20 Claims, 6 Drawing Sheets

APPARATUS AND METHOD FOR HARVESTING ENERGY

CROSS REFERENCE TO RELATED APPLICATIONS

This application is a Non-Provisional application of a U.S. Provisional Application Ser. No. 61/276,479 entitled 'Piezoelectric electronics case' and filed on Sep. 10, 2009. The entire teachings of the above application are incorporated herein by reference.

FIELD OF THE INVENTION

The invention relates to a device for harvesting energy and more specifically the invention relates to apparatus and method for providing power to an electronic device.

BACKGROUND OF THE INVENTION

The rapid proliferation of portable electronic devices such as mobile phones, laptops, Personal Desktop Assistants (PDAs), portable media players and various electronic sensors and devices, has tremendously increased the demand for portable or unwired electric power. Generally, such devices are powered by rechargeable batteries. Examples, of rechargeable batteries include Lithium-Ion (Li-ion), Nickel-Metal Hydride (NiMH), Nickel Zinc (NiZN), and so forth. Typically, such batteries are charged by using charging devices such as commonly known Alternating Current (AC) adaptors. However, a charging device requires an external power source to charge a battery or power an electronic device. Moreover, various rechargeable battery chemistries are unstable at elevated temperatures. Therefore, such batteries may be required to be charged at a slow rate, while maintaining the charge accumulated during the charging.

Various energy harvesting (or "power scavenging") technologies are known for generation and storage of electricity from mechanical vibrations of objects. Moreover, energy harvesting can provide an alternative solution, which is renewable and could conceivably not require replacement during the lifetime of the device. However, the small amount of energy available from the ambient environment and the low efficiency of most energy harvesting schemes have limited the application of these technologies to large wireless sensor nodes having power consumption of a few micro-Watts (M). The energy harvesting technologies may use a piezoelectric element such as a piezoelectric bimorph cantilever to generate energy from the vibrations of the mechanical objects. The piezoelectric bimorph cantilever can generate a useful voltage when it is deflected. Also, various other configurations of piezoelectric elements such as trapezoidal, cylindrical or conical can be used to increase energy output.

FIG. 1 illustrates a typical prior art arrangement of a piezoelectric bimorph cantilever 102. As shown, when a mass is attached to a free end 104 of cantilever 102 and input vibrations are provided at a base 106, then free end 104 with a mass 110 is deflected. Further, for piezoelectric materials layers 108a and 108b, the voltage ($V_{out}$) generated at electrodes is approximately proportional to the strain in piezoelectric materials layers 108a and 108b. Therefore, various energy harvesting devices are frequently designed relatively large for thin film devices (in order of centimeters), to accommodate a large proof mass (such as mass 110) and cantilever 102 with low stiffness. However, larger piezoelectric bimorphs are generally stiffer than smaller piezoelectric bimorphs. Furthermore, in various practical applications, the typical ambient vibration frequencies are very low, and/or multiple frequencies are present in the ambient environment, therefore the performance predictions for energy harvesting devices designed are unsatisfactory.

In light of the above discussion, techniques are desirable for efficient harvesting of energy for charging batteries and/or providing power to the electronic devices.

SUMMARY

The present invention provides an apparatus for generating electrical energy from mechanical vibrations of an object is provided. The apparatus comprising a case, the case comprising: a first case member comprising a first opposing surface and a second opposing surface, said first case member comprising an internal space between the first opposing surface and the second opposing surface for housing the object; a plurality of piezoelectric elements configured to generate electrical energy from the mechanical vibrations, each of said piezoelectric elements comprising a first end and a second end, wherein each of said piezoelectric elements being arranged over the first opposing surface and the second opposing surface at the first end; a second case member movably suspended on the first case member, wherein said second case member interfaces with the second end of each of said piezoelectric elements arranged over the first opposing surface; and a third case member movably suspended on the first case member, wherein said third case member interfaces with the second end of each of said piezoelectric elements arranged over the second opposing surface.

The present invention further provides a method for generating electrical energy from mechanical vibrations of an object. The method comprising: placing the object in a case of an apparatus, the case comprising: a first case member comprising a first opposing surface and a second opposing surface, said first case member comprising an internal space between the first opposing surface and the second opposing surface for housing the object; a plurality of piezoelectric elements configured to generate electrical energy from the mechanical vibrations, each of said piezoelectric elements comprising a first end and a second end, wherein each of said piezoelectric elements being arranged over the first opposing surface and the second opposing surface at the first end; a second case member movably suspended on the first case member, wherein said second case member interfaces with the second end of each of said piezoelectric elements arranged over the first opposing surface; and a third case member movably suspended on the first case member, wherein said third case member interfaces with the second end of each of said piezoelectric elements arranged over the second opposing surface; and absorbing mechanical vibrations from the object.

The present invention further provides a system for harvesting energy. The system comprising: a portable object; and a device for generating electrical energy from mechanical vibrations of an object, comprising: a case comprising: a first case member comprising a first opposing surface and a second opposing surface, said first case member comprising an internal space between the first opposing surface and the second opposing surface for housing the object; a plurality of piezoelectric elements configured to generate electrical energy from the mechanical vibrations, each of said piezoelectric elements comprising a first end and a second end, wherein each of said piezoelectric elements being arranged over the first opposing surface and the second opposing surface at the first end; a second case member movably suspended on the first case member, wherein said second case member interfaces with the second end of each of said piezoelectric elements arranged over the first opposing surface; and a third case member movably suspended on the first case member, wherein said third case member interfaces with the second end of each of said piezoelectric elements arranged over the second opposing surface.

An aspect of the invention is to harvest energy from the object for providing electrical power to the object.

Another aspect of the invention is to harvest the energy from an object for recharging the batteries of the object.

Another aspect of the invention is to provide a portable apparatus for recharging the batteries of the object without the requirement of an external power source.

Another aspect of the invention is to integrate a generator for harvesting energy into an electronic device.

The object may be placed in the internal space provided in the apparatus. The object may vibrate due to mechanical motions such as walking, shifting, cycling, driving and so forth. The mechanical vibrations of the object are used to generate electrical energy by multiple piezoelectric elements. The electrical energy may then be used to recharge the batteries or power the object directly.

BRIEF DESCRIPTION OF THE DRAWINGS

Figure 1:
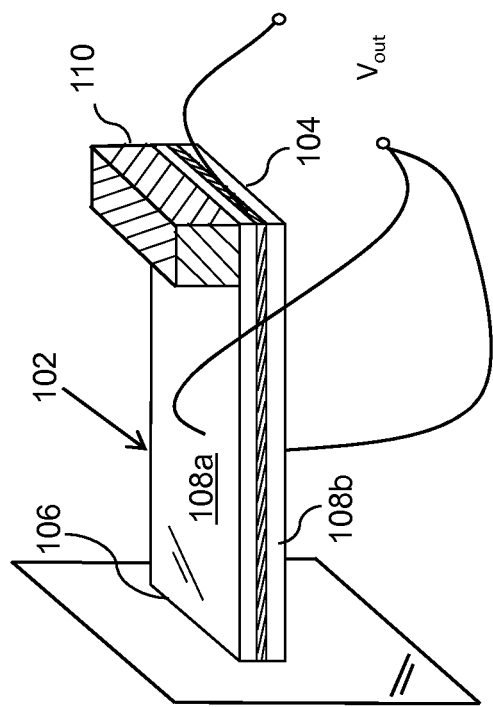
Figure 2:
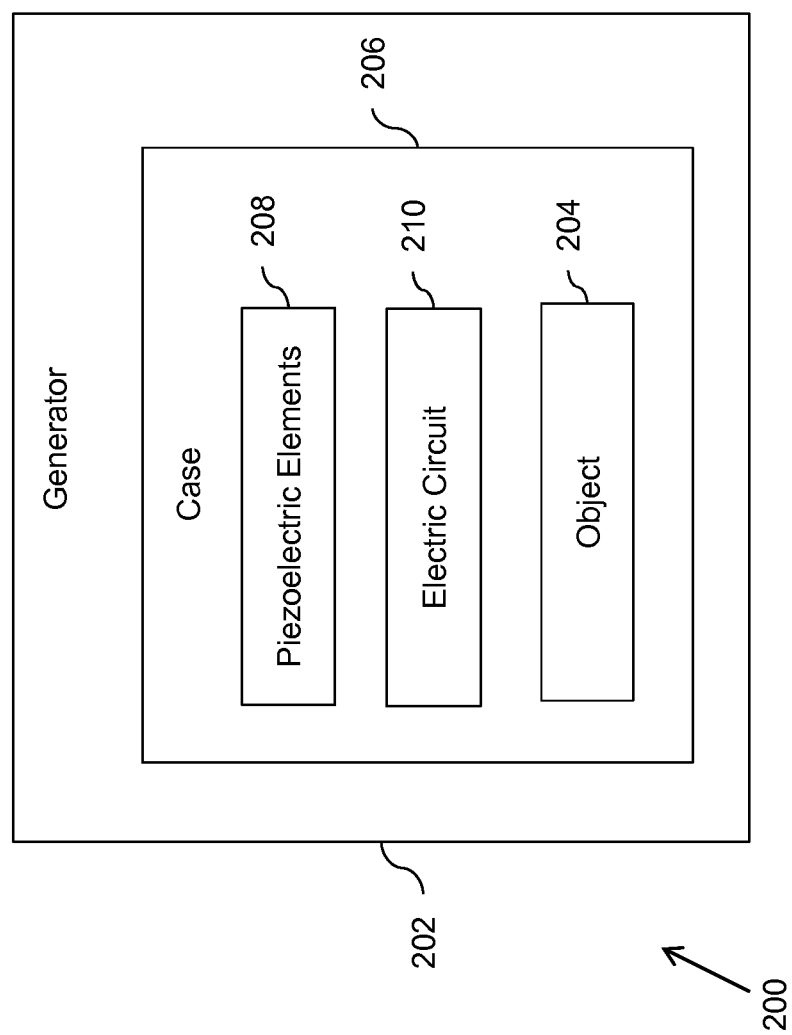
Figure 3:
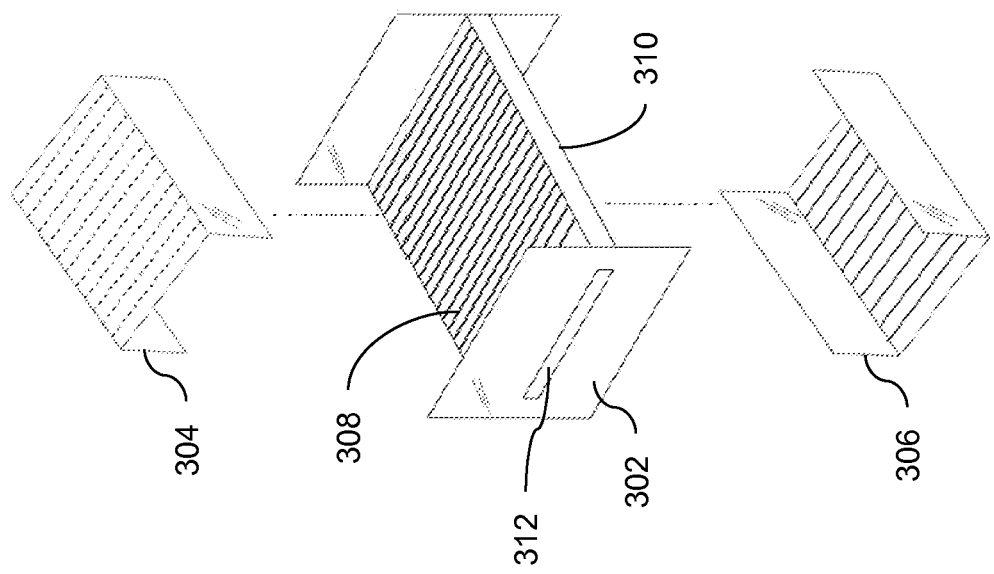
Figure 4:
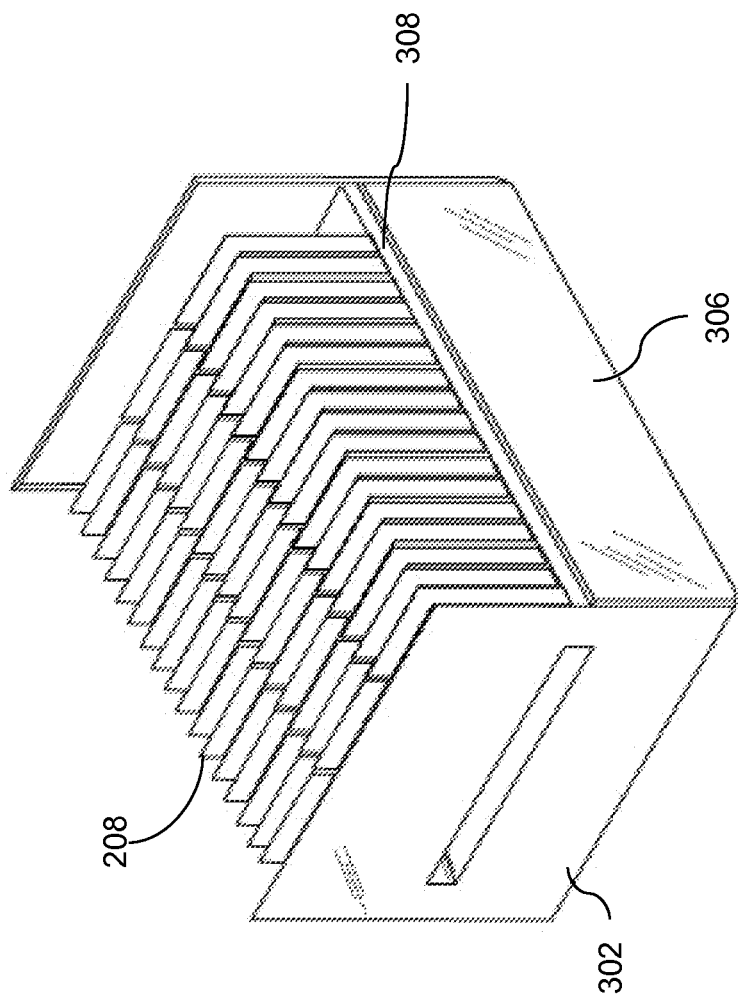
Figure 5:
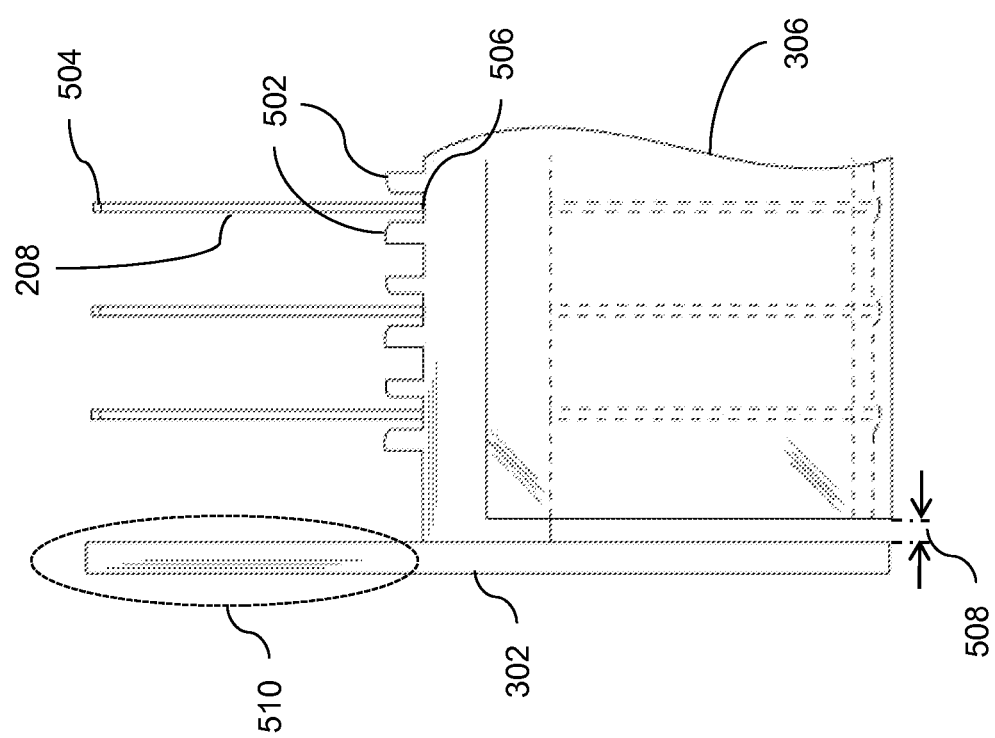
Figure 6:
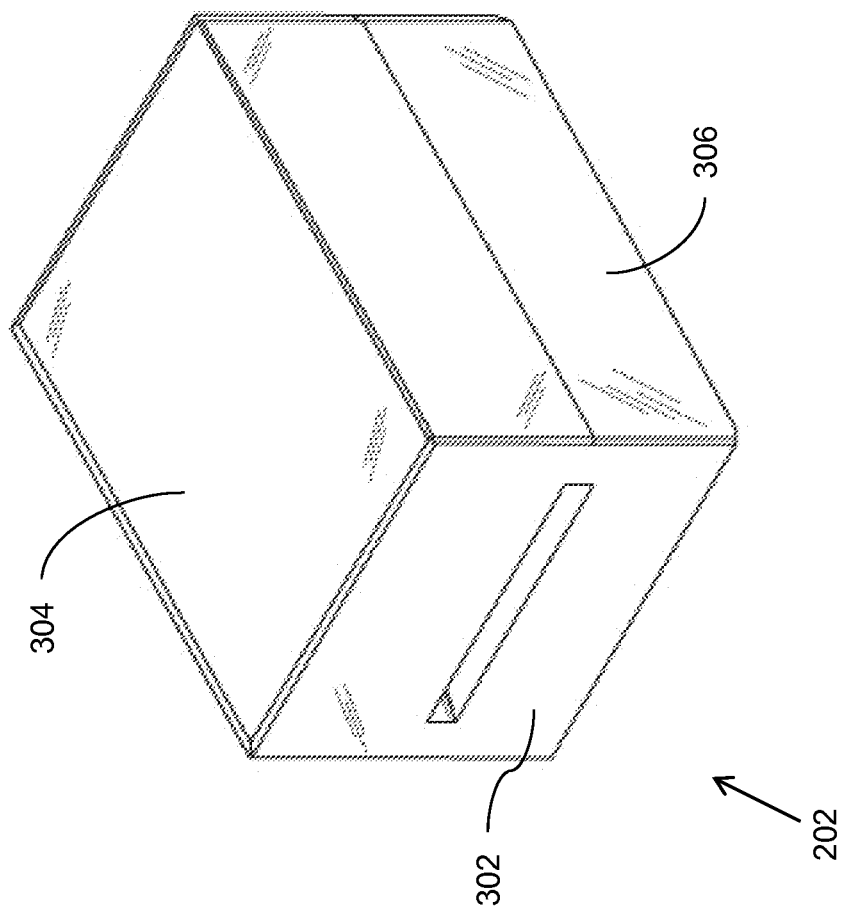

Having thus described the invention in general terms, reference will now be made to the accompanying drawings, which are not necessarily drawn to scale, and wherein:

FIG. 1 illustrates a typical prior art arrangement of a piezoelectric bimorph cantilever;

FIG. 2 illustrates a system for harvesting energy, in accordance with an embodiment of the invention;

FIG. 3 illustrates exemplary case elements of a case of a generator, in accordance with an embodiment of the invention;

FIG. 4 illustrates multiple piezoelectric elements arranged over the case, in accordance with an embodiment of the invention;

FIG. 5 illustrates exemplary arrangement of flanges for attaching the piezoelectric elements on the case; and FIG. 6 illustrated a complete case in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 2, a system 200 for harvesting energy is illustrated, in accordance with an embodiment of the invention. System 200 includes a generator 202 that generates electrical energy from mechanical vibrations of an object 204. Moreover, generator 202 uses the generated electrical energy to recharge the battery of object 204. Examples of object 204 include, but are not limited to, a laptop, a mobile phone, a Personal desktop assistant, or any other electronic device.

Generally, object 204, such as a laptop, contains rechargeable batteries that need to be recharged with external power sources. Further, object 204, such as a laptop, may be carried by a user in a carry bag or a carry case. Therefore, the object 204 may move or vibrate in the carry case due to activities of the user such as walking, cycling, driving and so forth. Generator 202 converts the vibrations of object 204 into electrical energy that can be used to charge the batteries of object 204. Examples of rechargeable batteries include, but are not limited to, Lithium-Ion (Li-ion), Nickel-Metal Hydride (NiMH), Nickel Zinc (NiZN), and so forth.

Generator 202 includes a case 206 that accommodates object 204 for converting the mechanical vibrations to electrical energy. Case 206 includes piezoelectric elements 208 and electric circuit 210 connected to piezoelectric elements 208. In an embodiment of the invention, piezoelectric elements 208 comprise bimorph piezoelectric elements. As known, piezoelectric elements generate electrical energy when they are bent. Therefore, piezoelectric elements 208 bend due to the mechanical vibrations of object 204 and generate electrical energy. Electric circuit 210 includes electrodes attached to each of piezoelectric elements 208, which transfer the generated electrical energy to object 204. In an embodiment of the invention, electric circuit 210 includes a bridge rectifier to rectify the generated electrical energy. As a result, the batteries of object 204 can be recharged without any external power source. The arrangement of piezoelectric elements 208 in case 206 is explained in detail in conjunction with FIG. 4. Further, the mass of object 204, when used as the proof mass of the system, may be more than that of mass 110 (shown in FIG. 1). As a result, the fundamental frequency of generator 202 is reduced drastically.

FIG. 3 illustrates exemplary case elements of case 206 of generator 202, in accordance with an embodiment of the invention. Case 206 includes a first case element 302 (here after referred to as inner case 302), a second case element 304 (here after referred to as top cover 304) and a third case element 306 (here after referred to as bottom cover 306). Inner case 302 includes a first opposing surface 308 and a second opposing surface 310. As shown, first opposing surface 308 and second opposing surface 310 are on the opposing sides of the inner case 302. Moreover, inner case 302 includes an internal space 312 between first opposing surface 308 and second opposing surface 310 for housing object 204. In an embodiment of the invention, the dimensions or shapes of internal space 312 are designed based on the dimensions of object 204. For example, internal space 312 may have a cylindrical shape to accommodate object 204 having a corresponding shape.

Piezoelectric elements 208 (not shown in FIG. 3) can be arranged over first opposing surface 308 and second opposing surface 310. Top cover 304 can be suspended on first opposing surface 308 of inner case 302. Similarly, bottom cover 306 can be suspended in second opposing surface 310 of inner case 302. Therefore, when an object placed in internal space 312 vibrates, then inner case 302 can move or shift with respect to top cover 304 and bottom cover 306. Further, top cover 304 and bottom cover 306 directly interface with the outside environment while covering piezoelectric elements 208. In an embodiment of the invention, the outside surfaces (that interface with outside environment) of top cover 304 and bottom cover 306 are made of a low friction material, such as Delrin. As a result, less energy is wasted in friction at the interface of piezoelectric elements 208 and/or when there is a sliding movement of inner case 302 inside top cover 304 and bottom cover 306.

In an embodiment of the invention, outer surfaces (which directly interface with the environment) of top cover 304 and bottom cover 306 are coated with a material of high friction, such as a thin coat of rubber, for maximum conversion of the vibrations into electrical energy. Moreover, the shape of the interface points for piezoelectric elements 208 in the top cover 304 and bottom cover 306 can be v-shaped to allow for the free deflection of piezoelectric elements 208.

With reference to FIG. 4, piezoelectric elements 208 mounted on first opposing surface 308 are shown, in accordance with an embodiment of the invention. As shown, bottom cover 306 is arranged over second opposing surface 310 of inner case 302, and piezoelectric elements 208 arranged over first opposing surface 308 are exposed. In an embodiment of the invention, piezoelectric elements 208 are arranged in form of rows and columns over first opposing surface 308 and second opposing surface 310. Further, insulating spacers may be provided either separately or fabricated into piezoelectric elements 208 for isolating electrodes.

The voltage and current output of generator 202 are determined by the number of piezoelectric elements 208 arranged over inner case 302. Further, electric circuit 210 may be designed to connect piezoelectric elements 208 electrically in series or parallel according to Kirchoff's voltage and current laws to customize a desired electrical energy output from generator 202. In an embodiment of the invention, a charge regime close to the ideal trickle-charge regime, that is at C/512 average with C/8 occasional spikes in current. In some cases, it may be advantageous to charge only a single cell of the batteries of object 204 at a time. In this case, a switch may be provided with the batteries to accommodate single-cell charging. In an exemplary scenario, the electrical energy output of each of piezoelectric elements 208 is 4 Volts (V) and 0.8 milli-Amperes (mA) at resonance. In this case, 120 number of piezoelectric elements 208 will supply at least 96 mA at the same voltage, which is more than sufficient to charge, for example, a 3.6V, 870 mAH Li ion battery cell typical in most laptop battery packs, with a current of more than 11% of the cell's capacity. Although it is possible to charge a standard 6 or 9 cell laptop battery pack, case 206 can be designed to charge individual 3.6V Li ion cells to reduce weight of case 206. Further, the dimensions of piezoelectric elements 208 can be designed based on the desired electrical output. In an embodiment of the invention, piezoelectric elements 208 may have alternate dimensions, for example cylindrical, conical, flat and so forth. Further, electrical circuit 210 can include impedance matching, and wideband input considerations to generate higher electrical outputs. In an embodiment of the invention, piezoelectric elements 208 may include trapezoidal bimorphs and/or multiple stacks of bimorph arrays. As a result, the overall strain in piezoelectric elements 208 is increased and that in turn generates higher electrical outputs.

Piezoelectric elements 208 can be attached over first opposing surface 308 and second opposing surface 310 by using flanges 502, as shown with reference to FIG. 5. Each of piezoelectric elements 208 includes a first end 504 at which piezoelectric elements are arranged over first opposing surface 308 and second opposing surface 310. Further, each of piezoelectric elements 208 includes a second end 506. Top cover 304 (not shown in FIG. 5) covers second end 506 of each of piezoelectric elements 208 arranged over first opposing surface 308. Similarly, bottom cover 306 covers second end 506 of each of piezoelectric elements 208 arranged over second opposing surface 310.

Flanges 510 at the ends of inner case 302 serve as stops to keep piezoelectric elements 308 from flexing further than a predefined maximal repeatable strain. In an embodiment of the invention, the predefined maximal repeatable strain may range from 400 to 500 microstrain. Moreover, piezoelectric elements 208 can bend at second end 506 attached to top cover 304 and bottom cover 306. Therefore, when an object placed in case 206 vibrates, inner case 302 moves between top cover 304 and bottom cover 306. As a result, piezoelectric elements 308 bend at second end 506 and electrical energy is generated. A person skilled in the art will appreciate that piezoelectric elements 308 can bend in direction of movement of inner case 302. In an embodiment of the invention, a gap 508 between inner case 302 and top cover 304 or bottom cover 306 equals the predefined maximum repeatable strain.

With reference to FIG. 6 a complete assembly of case 206 is illustrated, in accordance with an embodiment of the invention. As shown, case 206 includes inner case 302 with internal space 312 for housing an object. In an embodiment of the invention, more than a single object may be housed in internal space 312. Further, case 206 includes top cover 304 and bottom cover 306 arranged over inner case 302. Further, top cover 304 and bottom cover 306 may connect to form a single contiguous case member.

The dimension of case 206 may be designed based on the dimensions of the object to be housed. Although, not shown, case 206 may include electrical circuit 210 to transmit the generated electrical energy to the object. In an embodiment of the invention, case 206 is designed to have such dimensions and weight for the user to carry it comfortably and to customize the power output to the particular electronic device being charged. In an embodiment of the invention, generator 202 can be integrated with object 204 at the time of manufacturing. Therefore, rechargeable batteries of the object can be recharged by simply carrying the object in case 206 of generator 202. As a result, the requirement of external power source for charging is reduced or eliminated.

Having discussed the exemplary embodiments and contemplated modifications to generator and case, it should be appreciated that a method for generating electrical energy from mechanical vibrations of an object is also contemplated. According to this method, a generator is provided. The case includes a first case member, a second case member and a third case member. The first case member comprises a first opposing surface and a second opposing surface. The object can be housed in an internal space formed between the first opposing surface and the second opposing surface.

Further, the case includes multiple piezoelectric elements arranged over a first opposing surface and a second opposing surface of the inner case. The piezoelectric elements comprise a first end and a second end, and are mounted at the first end on the first and the second opposing surface. The piezoelectric elements generate electrical energy from the mechanical vibrations of the object. In an embodiment of the invention, the piezoelectric elements comprise bimorph piezoelectric elements.

The second case member is movably suspended on the first opposing surface of the first case member. Similarly, the third case member is movably suspended on the second opposing surface of the first case member. Further, the second case member and the third case member are attached to the second end of the piezoelectric elements.

The object is placed in the internal space of the case. Therefore, when mechanical vibrations are generated by the object, the first case member moves between the second case member and the third case member. As a result, the piezoelectric elements bend repeatedly and electrical energy is generated. The electrical energy is absorbed by the generator and processed by an electrical circuit and transmitted to the object for recharging the batteries.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for generating electrical energy from mechanical vibrations of an object, comprising:
    a case comprising:
        a first case member comprising a first opposing surface and a second opposing surface, said first case member comprising an internal space between the first opposing surface and the second opposing surface for housing the object;
        a plurality of piezoelectric elements configured to generate electrical energy from the mechanical vibrations, each of said piezoelectric elements comprising a first end and a second end, wherein each of said piezoelectric elements arranged over the first opposing surface and the second opposing surface at the first end;
        a second case member movably suspended on the first case member, wherein said second case member interfaces with the second end of each of said piezoelectric elements arranged over the first opposing surface; and
        a third case member movably suspended on the first case member, wherein said third case member interfaces with the second end of each of said piezoelectric elements arranged over the second opposing surface.

2. The apparatus of claim 1, further comprising:
    an electric circuit comprising a plurality of electrodes attached to each of said piezoelectric elements, said electrodes being configured to transmit the generated electrical energy to the object.

3. The apparatus of claim 1, wherein the object comprises a rechargeable battery.

4. The apparatus of claim 3, wherein the rechargeable battery being a Lithium-ion battery.

5. The apparatus of claim 1, wherein the piezoelectric elements being bimorph piezoelectric elements.

6. The apparatus of claim 1, wherein the object being a laptop computer.

7. The apparatus of claim 1, wherein repeatable strain in said piezoelectric elements ranges from 400 to 500 microstrain.

8. The apparatus of claim 1, wherein the second end of said piezoelectric elements are configured to bend based on sliding movement of the first case, and wherein the sliding movement is based on the mechanical vibrations.

9. A method for generating electrical energy from mechanical vibrations of an object, the method comprising:
    placing the object in a case of an apparatus, the case comprising:
        a first case member comprising a first opposing surface and a second opposing surface, said first case member comprising an internal space between the first opposing surface and the second opposing surface for housing the object;
        a plurality of piezoelectric elements configured to generate electrical energy from the mechanical vibrations, each of said piezoelectric elements comprising a first end and a second end, wherein each of said piezoelectric elements arranged over the first opposing surface and the second opposing surface at the first end;
        a second case member movably suspended on the first case member, wherein said second case member interfaces with the second end of each of said piezoelectric elements arranged over the first opposing surface; and
        a third case member movably suspended on the first case member, wherein said third case member interfaces with the second end of each of said piezoelectric elements arranged over the second opposing surface; and
    absorbing mechanical vibrations from the object.

10. The method of claim 9, further comprising transmitting the generated electrical energy to the object from an electric circuit comprising a plurality of electrodes attached to each of said piezoelectric elements.

11. The method of claim 9, wherein the object comprises a rechargeable battery.

12. The method of claim 11, wherein the rechargeable battery being a Lithium-ion battery.

13. The method of claim 9, wherein the piezoelectric elements being bimorph piezoelectric elements.

14. The method of claim 9, wherein the object being a laptop computer.

15. The method of claim 9, wherein repeatable strain in said piezoelectric elements ranges from 400 to 500 microstrain.

16. The method of claim 9, further comprising bending the second end of said piezoelectric elements based on sliding movement of the first case, wherein the sliding movement is based on the mechanical vibrations.

17. A system for harvesting energy, comprising:
    a portable object; and
    a device for generating electrical energy from mechanical vibrations of an object, comprising:
        a case comprising:
            a first case member comprising a first opposing surface and a second opposing surface, said first case member comprising an internal space between the first opposing surface and the second opposing surface for housing the object;
            a plurality of piezoelectric elements configured to generate electrical energy from the mechanical vibrations, each of said piezoelectric elements comprising a first end and a second end, wherein each of said piezoelectric elements arranged over the first opposing surface and the second opposing surface at the first end;
            a second case member movably suspended on the first case member, wherein said second case member interfaces with the second end of each of said piezoelectric elements arranged over the first opposing surface; and
            a third case member movably suspended on the first case member, wherein said third case member interfaces with the second end of each of said piezoelectric elements arranged over the second opposing surface.

18. The system of claim 17, wherein the device comprising an electric circuit, said electric circuit comprising a plurality of electrodes attached to each of said piezoelectric elements, said electrodes being configured to transmit the generated electrical energy to the object.

19. The system of claim 17, wherein the second end of said piezoelectric elements are configured to bend based on sliding movement of the first case, and wherein the sliding movement is based on the mechanical vibrations.

20. The system of claim 17, wherein the piezoelectric elements being bimorph piezoelectric elements.

* * * * *